US00RE47658E

(19) United States
(12) Reissued Patent
Shimotono et al.

(10) Patent Number: US RE47,658 E
(45) Date of Reissued Patent: Oct. 22, 2019

(54) HEAT DISSIPATION SYSTEM FOR COMPUTERS

(71) Applicant: LENOVO (SINGAPORE) PTE. LTD., Singapore (SG)

(72) Inventors: Susumu Shimotono, Hadano (JP); Fusanobu Nakamura, Yamato (JP)

(73) Assignee: LENOVO (SINGAPORE) PTE LTD, Singapore (SG)

(21) Appl. No.: 14/227,798

(22) Filed: Mar. 27, 2014

Related U.S. Patent Documents

Reissue of:
(64) Patent No.: 8,150,561
Issued: Apr. 3, 2012
Appl. No.: 12/503,967
Filed: Jul. 16, 2009

(30) Foreign Application Priority Data

Aug. 2, 2008 (JP) ..... 2008-200288

(51) Int. Cl.
*G05D 23/19* (2006.01)
*G06F 1/00* (2006.01)
*G06F 1/20* (2006.01)

(52) U.S. Cl.
CPC ..... *G06F 1/206* (2013.01); *Y02D 10/16* (2018.01)

(58) Field of Classification Search
CPC ..... G06F 1/206; Y02B 60/1275
USPC ..... 700/300, 299; 702/130, 132; 713/300, 713/322
See application file for complete search history.

(56) References Cited

U.S. PATENT DOCUMENTS 6,311,287 B1 * 10/2001 Dischler et al. ..... 713/601
7,630,856 B2 * 12/2009 Rockenfeller et al. ..... 702/132
8,150,561 B2 4/2012 Shimotono et al.
8,374,730 B2 * 2/2013 Conroy et al. ..... 700/299
2005/0275365 A1 * 12/2005 Currie et al. ..... 318/471
2006/0129881 A1 * 6/2006 Furuichi ..... G06F 1/206 714/11
2007/0027580 A1 * 2/2007 Ligtenberg et al. ..... 700/300
2007/0067136 A1 * 3/2007 Conroy et al. ..... 702/130
2007/0162160 A1 * 7/2007 Chang ..... G06F 1/206 700/25

(Continued)

FOREIGN PATENT DOCUMENTS

CN 1512293 A 7/2004
CN 1848041 A 10/2006
CN 1860447 A 11/2006

(Continued)

*Primary Examiner* — Deandra M Hughes
(74) *Attorney, Agent, or Firm* — Antony P. Ng; Russell Ng PLLC

(57) ABSTRACT

A heat dissipation system within a housing of a computer is disclosed. The heat dissipation system includes a heat dissipating fan, a temperature sensor, a rotation speed setting portion, and a performance control portion. The rotation speed setting portion is configured to change a rotation speed of the heat dissipating fan in a stepwise manner based on a threshold temperature and a measurement temperature measured by the temperature sensor. The performance control portion is configured to temporarily reduce the processing capability of a processor within the computer in response to a determination that the measurement temperature has exceeded the threshold temperature during a predetermined period of time.

15 Claims, 9 Drawing Sheets

(56) References Cited

U.S. PATENT DOCUMENTS

| | | | | |
|---|---|---|---|---|
| 2009/0259347 | A1* | 10/2009 | Gross et al. | 700/299 |
| 2009/0323277 | A1* | 12/2009 | Hosokawa | G06F 1/203 361/679.54 |

FOREIGN PATENT DOCUMENTS

| | | | |
|---|---|---|---|
| CN | 1991772 | A | 7/2007 |
| JP | 08-328698 | | 12/1996 |
| JP | 08328698 | A | 12/1996 |
| JP | 2007-22617 | | 9/2007 |
| JP | 2007226617 | A | 9/2007 |

* cited by examiner

60
| ELECTRONIC DEVICE | TEMPERATURE SENSOR | REFERENCE TEMPERATURE VALUE (°C) | | | | | |
|---|---|---|---|---|---|---|---|
| | | HIGH-SPEED ROTATION | | MEDIUM-SPEED ROTATION | | LOW-SPEED ROTATION | |
| | | HTe | HTd | MTe | MTd | LTe | LTd |
| CPU | 11T | 101 | 98 | 58 | 55 | 54 | 50 |
| ELECTRONIC DEVICE A | 13T | 86 | 83 | 59 | 57 | 56 | 53 |
| ELECTRONIC DEVICE B | 15T | 86 | 83 | 59 | 57 | 56 | 53 |
| ELECTRONIC DEVICE C | 17T | 61 | 58 | 45 | 43 | 42 | 38 |
| ELECTRONIC DEVICE D | 19T | 58 | 56 | 44 | 40 | 39 | 35 |
FIG. 3
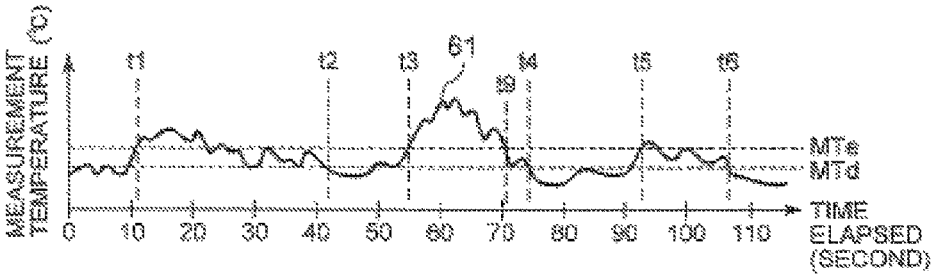
FIG. 4A
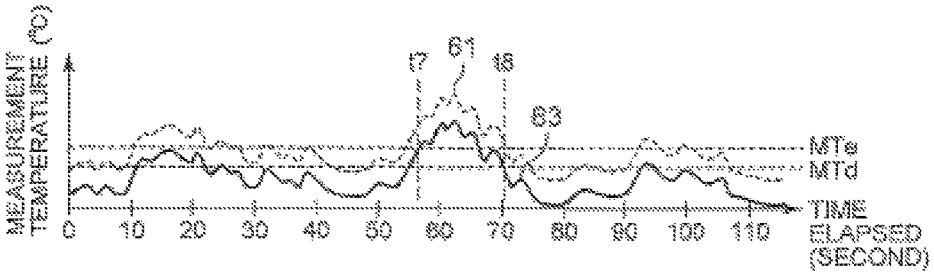
FIG. 4B

| PERFORMANCE STEP Pn | TIME ty | (100-Pn)×ty/100 |
|---|---|---|
| 100% | 10 | 0 |
| 80% | 20 | 4 |
| 60% | 25 | 10 |
| 40% | 15 | 9 |
| 20% | 5 | 4 |
| PERFORMANCE CHARACTERISTIC VALUE | | 27 |

FIG. 9

HEAT DISSIPATION SYSTEM FOR COMPUTERS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

PRIORITY CLAIM

The present application claims benefit of priority under 35 U.S.C. §119 to the previously filed Japanese Patent Application No. JP2008-200288 entitled, "Heat Dissipation System for Computer" with a priority date of Aug. 2, 2008, which is incorporated by reference herein.

BACKGROUND OF THE INVENTION

1. Technical Field

The present invention relates to heat dissipation in general, and in particular to a method for managing the speed of a heat dissipating fan for a computer system while harmonizing the processing capability of a processor within the computer system.

2. Description of Related Art

A notebook personal computer (note PC) typically includes many electronic components, such as processors, memories, video cards, etc., which are mounted in high-density within a housing. Such electronic components tend to emit heat during the operation of the note PC, which raises the temperature of the electronic components as well as the housing. A temperature sensor for monitoring temperature is provided within or around certain important electronic components.

Some note PCs may include a heat dissipating (or cooling) fan for dissipating heat by forcing outside air into the housing when the temperature measured by the temperature sensor increases. The heat dissipating fan is configured to be capable of adjusting an amount of heat dissipation by controlling a rotation speed of the heat dissipating fan in multiple steps. The rotation speed of the heat dissipating fan can be increased when the temperature measured by the temperature sensor exceeds a threshold value, or decreased when the measured temperature becomes lower than the threshold value. However, when the rotation speed is controlled in both fast and slow directions based on one threshold value between adjacent rotation speeds, the rotation speed of the heat dissipating fan changes frequently, which can make a noisy sound. Thus, the rotation speed control has hysteresis characteristics, i.e., the note PC controls the rotation speed so that the rotation speed is increased by one step when the temperature of the temperature sensor exceeds a threshold temperature Th1 and is returned to a previous rotation speed when the temperature becomes lower than a threshold temperature Th2 (Th2<Th1).

Among all electronic components mounted within a note PC, a central processing unit (CPU) produces the largest amount of heat. A technology called SpeedStep® can reduce consumption power by decreasing the clock speed and operating voltage of the CPU. In addition, a technology called throttling can operate the CPU intermittently in order to reduce the consumption power. Both of the above-mentioned technologies are able to decrease the amount of heat generation by reducing the processing capability of the CPU. The Advanced Configuration and Power Interface (ACPI) specification distinguishes and defines two cooling methods, namely, active cooling and passive cooling, regarding heat dissipation in computer systems.

Under the active cooling method, the heat dissipating fan is activated first when the temperature of the computer begins to rise, and the processing capability of the CPU is then reduced when the temperature continues to rise after the rotation speed of the heat dissipating fan has reached the maximum rotation speed. Under the passive cooling method, the processing capability of the CPU is initially reduced when the temperature of the computer begins to rise, and the heat dissipating fan is then activated when the temperature continues to rise after the processing capability of the CPU has reduced to the lowest level. The active cooling method places a higher priority on the processing capability, and the passive cooling method places a higher priority on suppressing consumption power and noise of the heat dissipating fan.

On the one hand, note PC users have a desire for a high processing capability so that they can complete their computing tasks in a relatively short amount of time; but on the other hand, they also desire for quietness from their note PC during operation because they prefer not to be annoyed by the heat dissipating fan noise. The amount of heat generation decreases as the processing capability reduces; therefore, it is possible to meet the quietness requirements because temperature can be maintained within a predetermined range even when the heat dissipating fan operates at a low rotation speed. However, the amount of heat generation increases as the processing capability increases; therefore, it is difficult to meet the quietness requirements because the heat dissipating fan needs to be operated at a high rotation speed in order to maintain the temperature. Therefore, the processing capability and the quietness become trade-off factors in control thereof via the internal temperature of the housing.

The heat dissipation method described in the ACPI specification is configured to preliminarily put priority on the processing capability preferential method and the quietness preferential method to be executed in order, or to execute any one of the methods in accordance with the user's selection. In other words, the processing capability preferential method and the quietness preferential method can be selectively executed, or alternatively, when it is too difficult to suppress the temperature rise with only one method, the other heat dissipation method is additionally executed while allowing the heat dissipation method being previously executed to work as much as possible.

When the note PC is used in an interactive mode, there is rarely a case where the processing capability preferential method and the quietness preferential method are to be executed simultaneously. In many cases, therefore, thermal design is performed so that temperature can be maintained by execution of either one of the methods. However, the noise generated from the heat dissipating fan is annoying when heat dissipation is performed by the processing capability preferential method, and the processing capability remains dissatisfactory when heat dissipation is performed by the quietness preferential method. Thus, thermal design is not always satisfactory to a note PC user. Therefore, it is obvious that the maximum level of a note PC user's comfort lies in a heat dissipation system functioning within a range in which the processing capability and the quietness are harmonized, and it is desirable to have a heat dissipation system capable of meeting those requirements.

In thermal design of a heat dissipation system that dissipates heat generated by electronic devices accommodated in a computer using a heat dissipating fan, a rotation speed of the heat dissipating fan is set to the lowest or stop state when a CPU is in an idle state, and the rotation speed of the heat dissipating fan is increased in a stepwise manner when a utilization rate of the CPU increases and an amount of heat generation thereof increases, thereby balancing the amount of heat dissipation and the amount of heat generation so that an inside of a housing is maintained at a predetermined temperature. When a user is performing tasks on the computer, a measurement temperature measured by a temperature sensor varies with the operation state of the system, and the heat dissipating fan operates at a rotation speed which is determined based on a threshold temperature for the measurement temperature. In the above-mentioned example, if the rotation speed control of the heat dissipating fan has hysteresis characteristics, the rotation speed of the heat dissipating fan is increased once the measurement temperature has increased above the threshold temperature Th1, and therefore, it takes a relatively long period of time until the measurement temperature decreases below the threshold temperature Th2 such that the rotation speed decreases.

However, when the changes in the measurement temperature upon application of a typical load to a personal computer other than to a server computer are monitored, it can be noticed that there is rarely a state where temperature that is high enough to increase the present rotation speed of the heat dissipating fan by one step is continuously measured for a long period of time and that a state where the CPU is required to operate with high processing capability occurs sporadically. When the measurement temperature decreases after the rotation speed was increased, although the rotation speed may be decreased between the threshold temperature Th1 and the threshold temperature Th2 from the viewpoint of thermal balancing, since the heat dissipating fan is rotating at one step higher rotation speed, there occurs a difference between the amount of heat dissipation that is based on the actual rotation speed of the heat dissipating fan and the actual amount of heat generation. Moreover, when the temperature exceeds the threshold temperature Th1 for a short period of time, it was noticed that prioritizing the quietness to temporarily decrease the processing capability, thereby maintaining a low rotation speed can provide higher level of comfort to the user than prioritizing the processing capability to increase the rotation speed of the heat dissipating fan.

SUMMARY OF THE INVENTION

A basic principle of the present invention lies in harmonizing the above-mentioned two trade-off factors, i.e., a processing capability of a processor related to a processing time and a rotation speed of a heat dissipating fan related to noise, from the viewpoint of maximizing the level of a user's comfort.

In accordance with a preferred embodiment of the present invention, a heat dissipating fan, a temperature sensor, and a processor are accommodated in a housing of a computer, and a rotation speed setting portion changes a rotation speed of the heat dissipating fan on the basis of a threshold temperature and a measurement temperature measured by the temperature sensor in a stepwise manner. A performance control portion temporarily reduces the processing capability of the processor when it is predicted that the measurement temperature measured by the temperature sensor exceeds a threshold temperature in a predetermined period of time so the rotation speed of the heat dissipating fan will increase.

When the processing capability of the processor is reduced, the amount of heat generation decreases. Since the processor rarely continues operating in a heavy load state and a state where a large amount of heat is generated from the processor is temporary when the computer is executing an interactive operation, the processor transitions to a light load state subsequent to the heavy load state. In a heavy load time zone, because the processing capability has been reduced, the processor becomes unable to process a part of a task that otherwise could be processed if the processing capability was not reduced. Although the portion of task remaining unprocessable is in a state of waiting for execution by the processor and an execution request is not yet issued for the unprocessed task because execution of a previous task is being delayed, the processor processes the unprocessed task in a subsequent light load time zone. Therefore, a portion of the task that was to be processed in a time zone where the processing capability is reduced is shifted to a subsequent time zone where the amount of tasks is small, so that it is possible to prevent or suppress an abrupt rise in the amount of heat generation of the processor. In this way, the amount of tasks is reduced by the reduction of the processing capability, the measurement temperature does not exceed the threshold temperature, and the rotation speed of the heat dissipating fan does not need to be increased.

The performance control portion may include a temperature prediction portion configured to calculate a prediction time required for the temperature measured by a temperature sensor to exceed a threshold temperature based on a present measurement temperature, a rate of rise in the present measurement temperature, and the threshold temperature; and a processing capability setting portion configured to change the processing capability of the processor based on the prediction time. The processing capability setting portion is able to minimize the amount of reduction in the processing capability, i.e., maximize the performance while preventing the measurement temperature from exceeding the threshold temperature, by executing either of reducing, maintaining, or increasing of the present processing capability based on the prediction time. The processing capability setting portion is able to determine an amount of reduction in the processing capability based on the prediction time and a utilization rate of the processor at the time of prediction.

The processing capability setting portion is able to produce a corrected prediction time, which is corrected from the prediction time, based on the utilization rate of the processor at the time of prediction and change the processing capability by a minimum unit amount based on the corrected prediction time. Reducing the processing capability by only the minimum unit amount can reduce the level of discomfort imposed to the users. The processing capability setting portion is able to determine an amount of reduction in the processing capability based on the prediction time and a utilization rate of the processor. When the reduction of the processing capability continues for a long period of time, such a delay of task is not permittable to the users. The performance determining portion is then able to measure the degree of delay in tasks as a performance characteristic value. The performance characteristic value can be calculated based on a period of time during which the processing capability is reduced from that in a normal state and an amount of reduction in the processing capability. Next, the performance determining portion issues a performance precedence command to the processing capability setting portion based on the performance characteristic value. Upon receiving the performance precedence command, the processing capability setting portion returns the processing capability of the processor to that in the normal state or decreases the present amount of reduction in the processing capability.

When users are allowed to adjust the timing for increasing the processing capability during reduction of the processing capability of the processor on the basis of the performance characteristic value, it is possible to harmonize between the optimum processing capability corresponding to the users' preference or the operation status and the quietness. Although the rotation speed setting portion changes the rotation speed based on the threshold temperature in a stepwise manner, the temperature prediction portion and the processing capability setting portion are operated similarly at the changed new rotation speed. According to the heat dissipation system of the present invention, when the rotation control of the heat dissipating fan is set to have hysteresis characteristics, the chance of occurrence of overcooling for achieving thermal balance can be decreased.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIG. 3 is a diagram of a thermal action table (TAT);

FIGS. 4A and 4B are diagrams illustrating a rotation speed of a heat dissipating fan when the heat dissipating fan is being operated;

FIG. 9 is a diagram for explaining the calculation of a performance characteristic value.

DETAILED DESCRIPTION OF A PREFERRED EMBODIMENT

Figure 1:
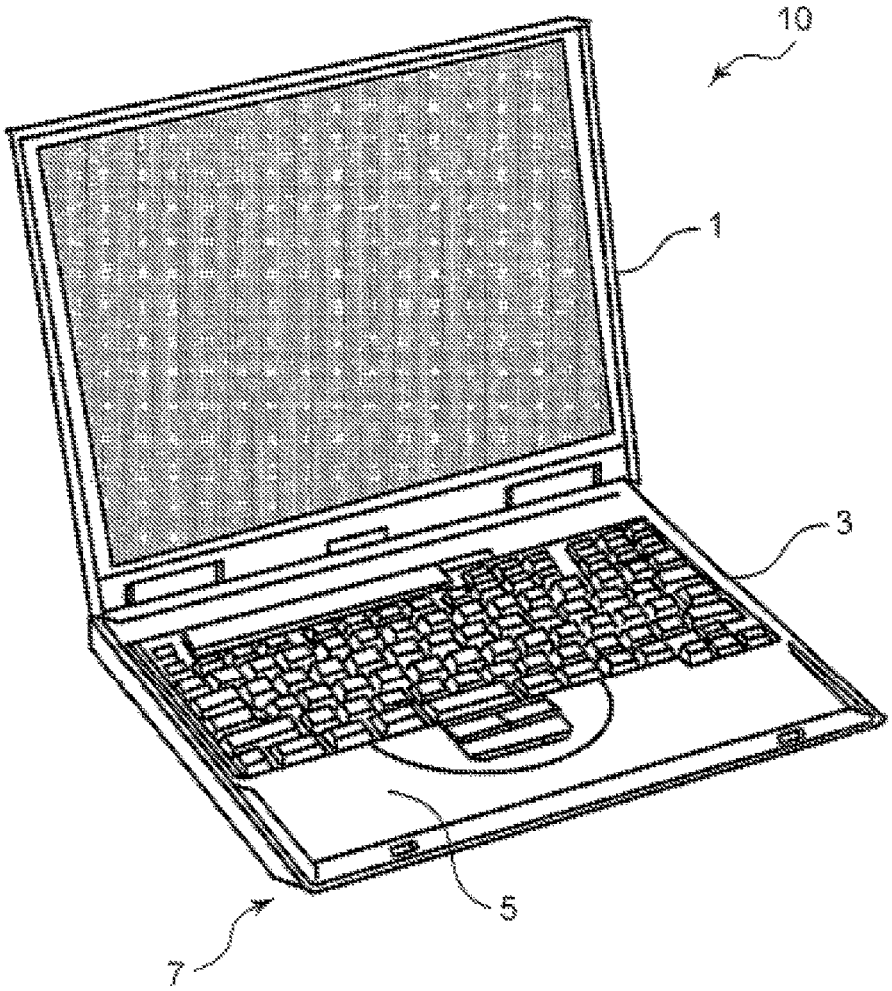
FIG. 1 is an external perspective view of a note PC, in accordance with a preferred embodiment of the present invention.
Figure 2:
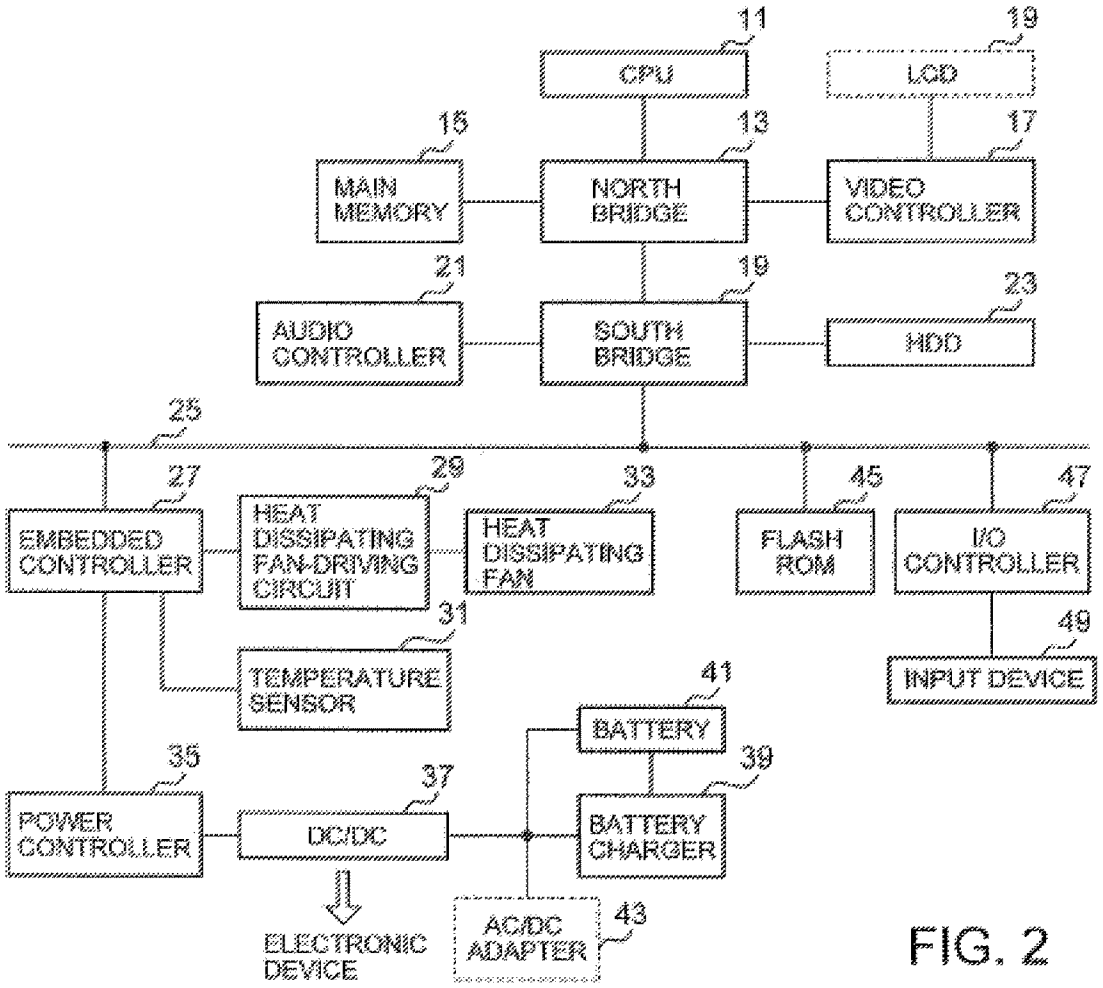
FIG. 2 is a block diagram of the note PC from FIG. 1.

Referring now to the drawings and in particular to FIG. 1, there is depicted an external perspective view of a note PC 10, in accordance with a preferred embodiment of the present invention. FIG. 2 is a block diagram of the note PC 10. The note PC 10 includes a system housing 3 in which a keyboard is mounted on a surface thereof and electronic components are accommodated and an LCD housing 1. The system housing 3 has mounted therein a set of electronic components that is depicted as a solid block in FIG. 2. During the usage of the note PC 10, a bottom surface 7 of the note PC 10 makes contact with user's laps and a palm rest 5 makes contact with user's hands. Therefore, the surface of the system housing 3 needs to be maintained at a predetermined temperature or lower, and for this purpose, a forced air-cooling type heat dissipation system has been conventionally employed in the note PC 10.

A CPU 11 is an arithmetic processing device performing the central function of the note PC 10 and executes an OS, a BIOS, a device driver, or application programs. The CPU 11 also executes a heat dissipation control program according to the present embodiment. The CPU 11 consumes the largest amount of power and generates the largest amount of heat among electronic components of the note PC 10. The CPU 11 is configured to support a technology called SpeedStep and a technology called throttling. The SpeedStep is a technology developed by Intel Inc. for allowing CPU's operating voltages and operating frequencies to be set freely. In the SpeedStep, a system BIOS sets a maximum allowable operating frequency corresponding to a system's state in a register of the CPU 11, thereby making it possible to lower an actual operating frequency, at which the CPU is operating, in a stepwise manner.

When lowering its operating frequency, the CPU 11 also reduces its operating voltage to a value needed to operate the CPU 11 at the operating frequency. When executing the SpeedStep, the CPU 11 instructs an embedded controller (EC) 27 so that a DC-DC converter 37 changes the voltage of the CPU 11 to be suitable for the maximum operating frequency that is set. By the SpeedStep, the consumption power and the amount of heat generation of the CPU 11 can be reduced. The throttling is a function that causes the CPU 11 to operate and stop at predetermined intervals of time so that it is operated in an intermittent manner, thereby switching an average processing speed. For the throttling to be executed, a system BIOS sets the validity/invalidity of throttling and a duty ratio (throttling rate) in the register of the CPU 11. Either the SpeedStep or the throttling can change the processing capability and the amount of heat generation of the CPU 11 in a stepwise manner.

The SpeedStep and the throttling may be used in conjunction with each other so the note PC may transition to the throttling while maintaining the lowest operating frequency in the SpeedStep. With these methods, particularly in relation with the present invention, it is important to be capable of changing the processing capability of the CPU 11 in a plurality of steps to adjust the amount of heat dissipation. Hereinafter, each step of the processing capability of the CPU 11, which is changed by the SpeedStep and the throttling or either one of them, will be referred to as a performance step. In the present embodiment, the performance step will be described as being divided into four steps of 100%, 75%, 50%, and 25%; however, the present invention is not limited to those steps. The performance step of 100% corresponds to a state where the processing capability is not reduced, and particularly, this state will be referred to as a normal state of the CPU 11.

The hardware and software installed in the note PC 10 are compatible with the standard called Advanced Configuration and Power Interface (ACPI). ACPI was formulated by the initiatives of Intel Inc., Microsoft Corp., and Toshiba Corp. as a united method for allowing an OS in cooperation with BIOS to manage the consumption power of devices constituting a PC. The ACPI allows the OS to take the initiative in finely setting and managing various functions and operations related to consumption power control such as power ON/OFF, suspend/resume, or control of heat dissipating fan. The ACPI supports the SpeedStep and throttling methods.

The CPU 11 controls a north bridge 13 and devices connected to the north bridge 13 via various buses. The north bridge 13 has a memory controller function for controlling an operation of accessing a main memory 15, a data buffer function for absorbing a difference in a data transfer rate between the CPU 11 and other devices, and the like. The main memory 15 is a volatile RAM (VRAM) used as a read area of programs executed by the CPU 11 and a work area to which processed data are written. A video controller 17 is connected to the north bridge 13, provided with a video chip and a VRAM, and configured to receive a drawing command from the CPU 11 to produce images of image files to be drawn and write the images in the VRAM and to deliver images read out of the VRAM to a liquid crystal display (LCD) 19 as an image data. The LCD 19 is accommodated in an LCD housing 1.

A south bridge 19 is connected to the north bridge 13 and is provided with interfaces for various peripheral input/output devices and ports for a PCI bus and a PCI-Express bus. The south bridge 19 is connected to an audio controller 21, a hard disk drive (HDD) 23, and the like. In the HDD 23, well-known programs such as an OS, a device driver, or an application program are stored as well as a heat dissipation control program according to the present embodiment. The configuration of the heat dissipation control program will be described later.

The OS is provided with a utilization rate meter indicating a utilization rate of the CPU 11. In the Windows® OS, the utilization rate meter is displayed in a performance item of a task manager. The OS is able to deliver the utilization rate of the CPU 11 to another program as information. The utilization rate of the CPU 11 is information representing a ratio, per unit period of time, of a period of time during which the CPU 11 executes a special null command called an idle process and remains in a standby state where the CPU 11 does not perform any operations, to a period of time during which the CPU 11 is occupied for execution of the OS, the application program, or the like. The utilization rate of the CPU 11 may change depending on the contents and number of programs being executed. The CPU performs more tasks per unit period of time as the utilization rate increases, increasing the consumption power and the amount of heat generation. Although not specifically described therein, in the case of a symmetric multiple processor (SMP) system where the CPU 11 is of a multicore type and is substantially equipped with a plurality of processors in a single package, a case where the respective processor cores are simultaneously in full-operation may be diagnosed as an upper limit operation rate (i.e., 100%), and a proper utilization rate in the whole processor group can be calculated. Specifically, when the CPU has two cores, for example, and one is in full operation and the other is in an idle state, the utilization rate becomes 50%.

The south bridge 19 is also connected via a PCI bus or an LPC bus 25 to legacy devices which have been conventionally used in the note PC 10 or devices not requiring high-speed data transmission. The LPC bus 25 is connected to an embedded controller (EC) 27, a flash ROM 45, an I/O controller 47, and the like. The EC 27 is a microcomputer configured by an 8 to 16 bit CPU, a ROM, a RAM, and the like, and is further provided with a multi-channel A/D input terminal, a D/A output terminal, a timer, and a digital input/output terminal. The EC 27 is connected to a heat dissipating fan-driving circuit 29, a temperature sensor 31, and a power controller 35 via the input/output terminals and is capable of executing a program for managing an internal operating environment of the note PC 10 independently of the CPU 11. In the ROM of the EC 27, a program for controlling a rotation speed of the heat dissipating fan 33 and a thermal action table (TAT) 60 (see FIG. 3) describing a reference temperature value are stored.

The heat dissipating fan-driving circuit 29 is connected to the heat dissipating fan 33. The heat dissipating fan 33 exhausts outside air drawn into the system housing 13 through heat sinks to achieve forced air-cooling of the inside of the system housing 3, thereby maintaining the electronic devices and the surface of the system housing 3 at an allowable temperature or lower. In addition, heat generated by the CPU 11, the video chip of the video controller 17, and the north bridge among the electronic devices mounted on the system housing 3 is exhausted to the outside via heat pipes and heat sinks, and heat generated by other electronic devices is dissipated to the outside by the flow of air moving within the system housing 3.

The temperature sensors 31 are installed at positions corresponding to major electronic devices and at predetermined positions of the system housing 3. The respective temperature sensors 31 may be positioned near target electronic devices to be monitored in an externally attached form or may be formed in a die of a corresponding electronic device in an embedded form. Temperature sensors for monitoring the CPU 11 and the video chip are in an embedded form, and temperature sensors for monitoring other electronic devices and the housing surface are in an externally attached form. The externally attached temperature sensors are mounted on a motherboard near the respective electronic devices.

The respective temperature sensors 31 are used for control of the heat dissipating fan 33 for the purpose of not only protecting the corresponding electronic devices and but also maintaining the surface temperature of the system housing 3 within a predetermined value. The EC 27 generates a control signal for the heat dissipating fan 33 based on the measurement temperature measured by the temperature sensor 31 and delivers the control signal to the heat dissipating fan-driving circuit 29. Then, the heat dissipating fan-driving circuit 29 performs an On/Off control of the heat dissipating fan 33 and stepwise control of the rotation speed based on the control signal delivered from the EC 27. In the present embodiment, the heat dissipating fan-driving circuit 29 controls the rotation speed of the heat dissipating fan 33 to correspond to any one of four categories: ultralow-speed rotation, low-speed rotation, medium-speed rotation, and high-speed rotation. It should be noted that the EC 27 changes the rotation speed between adjacent rotation speeds; for example, a control wherein the rotation speed is changed directly from ultralow-speed rotation to medium-speed rotation is not performed.

The power controller 35 is a semiconductor logic circuit for controlling the power of the note PC 10. The power controller 35 is connected to a DC-DC converter 37. The DC-DC converter 37 converts a DC voltage supplied from an AC/DC adapter 43 or a battery 41 to a set of voltages and then supplies electric power to the CPU 11 and other electronic devices. When connected to the note PC 10, the AC/DC adapter 43 supplies electric power to the DC-DC converter 37 and a battery charger 39 charging the battery 41.

A flash ROM 45 is a nonvolatile memory, in which the stored contents are electrically rewritable, and stores therein a system BIOS, which controls I/O devices and manages power supply, temperature of a housing, and the like, a POST (Power-On Self Test), which implements test or initialization of hardware components upon activation of the note PC 10, and the like. The heat dissipation control program designates the operating frequency or throttling rate to be set upon allowing the CPU 11 to execute the SpeedStep or the throttling and sends a notification to the system BIOS via a power management driver. Upon receiving the notification, the system BIOS sets the designated operating frequency or throttling rate in the register of the CPU 11. The I/O controller 47 is connected to an input device 49 such as a keyboard or a mouse.

FIG. 3 is a diagram illustrating the configuration of the TAT 60. The TAT 60 describes a reference temperature value for changing the operation state of the heat dissipating fan 33 for each electronic device between ultralow-speed rotation, low-speed rotation, medium-speed rotation, and high-speed rotation. The reference temperature value includes an enable temperature and a disable temperature for each operation state and forms hysteresis characteristics between the case when the rotation speed is changing in an increasing direction and the case when the rotation speed is changing in a decreasing direction. The enable temperatures LTe, MTe, and HTe are temperature values, at which when the measurement temperature of the temperature sensor shows an increasing tendency, the heat dissipating fan 33 is allowed to transition from an operation state where the rotation speed is one step lower to an operation state corresponding to the measurement temperature. The disable temperatures LTd, MTd, and HTd are temperature values, at which when the measurement temperature of the temperature sensor shows a decreasing tendency, the heat dissipating fan 33 is allowed to transition from an operation state corresponding to the measurement temperature to an operation state where the rotation speed is one step lower.

It is assumed that temperature sensors 11T-19T are installed so as to correspond to the CPU 11 and the electronic devices A to D, respectively. Moreover, in the note PC 10, the temperature sensors are installed not only at positions corresponding to the electronic devices but also at positions corresponding to the surface of the system housing 3. The reference temperature values which are set for each of the temperature sensors 31 are set to operate the heat dissipating fan 33 at a rotation speed as low as possible when the respective electronic devices and the respective temperature sensors monitoring them are actually mounted in the system housing 13, thereby preventing the surface temperature at predetermined locations of the system housing 3 from exceeding a predetermined value. In addition, the reference temperature values are set to operate the heat dissipating fan 33 at an appropriate rotation speed so that temperatures of the electronic devices do not exceed critical temperature. In the case when the temperatures of the electronic devices increase above the critical temperature, the note PC 10 stops its operation or transitions to a suspend state or a hibernation state.

When the measurement temperature measured by any of the temperature sensors 31 reaches an enable temperature set for a target electronic device to be monitored, the EC 27 increases the rotation speed of the heat dissipating fan 33 by one step while decreasing the rotation speed of the heat dissipating fan 33 by one step when the measurement temperatures measured by all the temperature sensors 31 decrease to a disable temperature or below set for the target electronic device to be monitored. Specifically, the heat dissipating fan 33 operates at low-speed rotation when the internal temperature of the housing increases and the measurement temperature of any of the temperature sensor 31 reaches the enable temperature LTe of the low-speed rotation, while operating at medium-speed rotation upon reaching the enable temperature LTe of the medium-speed rotation and at high-speed rotation upon reaching the enable temperature HTe of the high-speed rotation.

When the load of the note PC 10 is decreased from a state where the heat dissipating fan 33 operates at high-speed rotation so the measurement temperatures measured by the temperature sensors 31 are decreased, the heat dissipating fan 33 transitions to medium-speed rotation when the measurement temperatures of all the temperature sensors 31 reach the disable temperature HTd of the high-speed rotation, while transitioning to low-speed rotation upon reaching the disable temperature MTd of the medium-speed rotation and to ultralow-speed rotation upon reaching the disable temperature LTd of the low-speed rotation.

FIGS. 4A and 4B are diagrams illustrating the rotation speed of the heat dissipating fan 33 and the measurement temperature measured by the temperature sensor 11T when the rotation speed of the heat dissipating fan 33 was controlled by the EC 27 based on the TAT 60. In FIGS. 4A and 4B, the vertical axis represents the measurement temperature measured by the temperature sensor 11T embedded in the CPU 11, and the horizontal axis represents time elapsed. These figures illustrate a state where the operation of the heat dissipating fan 33 is dominantly controlled by the temperature sensor 11T among the plurality of temperature sensors. Line 61 depicts changes in the measurement temperature when a test program was executed by the CPU 11.

In FIG. 4A, the rotation speed of the heat dissipating fan 33 is at medium-speed rotation in time zones between t1 and t2, t3 and t4, and t5 and t6 and is at low-speed rotation in other time zones. Line 63 of FIG. 4B depicts changes in the measurement temperature when the same test program as the case of FIG. 4A is executed by the CPU 11 so that the maximum operating frequency of the CPU 11 is fixed to ⅓ of that in the normal state. The operating frequency and the operating voltage of the CPU 11 are lowered and the line 63 is shifted to the line 61 in the direction of lowering the temperature. In FIG. 4B, the rotation speed of the heat dissipating fan 33 is at medium-speed rotation in a time zone between t7 and t8 and is at low-speed rotation in other time zones.

As seen from the changes in the measurement temperature and the operation state of the heat dissipating fan, in a normal use state where the note PC 10 is used in an interactive mode, aside from a state where the CPU 11 is performing complex technical calculations or executing a heavy load program such as image processing, it can be known that the state where the measurement temperature is higher than the enable temperature MTe is temporary and the state does not continue long. It also can be known that in a time zone, for example, between t9 and t4 of FIG. 4A, although the heat dissipating fan 33 may be operated at the low-speed rotation because of the hysteresis characteristics of the fan control from the viewpoint of thermal balancing, the heat dissipating fan is operated at the medium-speed rotation, resulting in an overcooling state. The overcooling state becomes the cause of generation of unnecessary noise and loss of consumption power.

Moreover, it can be known that when the operating frequency was lowered by a factor of ⅓ in FIG. 4B, although the heat dissipating fan 33 is operated at the medium-speed rotation only in a time zone between t7 and t8 so the period of the medium-speed rotation is reduced from that in the case of FIG. 4A, the operating frequency is lowered in many time zones in which the measurement temperature does not affect the increase in the rotation speed of the heat dissipating fan 33. The heat dissipation system according to the present embodiment is therefore capable of reducing the generation of unnecessary noise from the heat dissipating fan 33 and loss of the consumption power by using the transition characteristics of the heat generation state of the CPU 11 based on normal use of the note PC 10 and preventing the operating frequency of the CPU 11 from being lowered more than is necessary.

Figure 5:
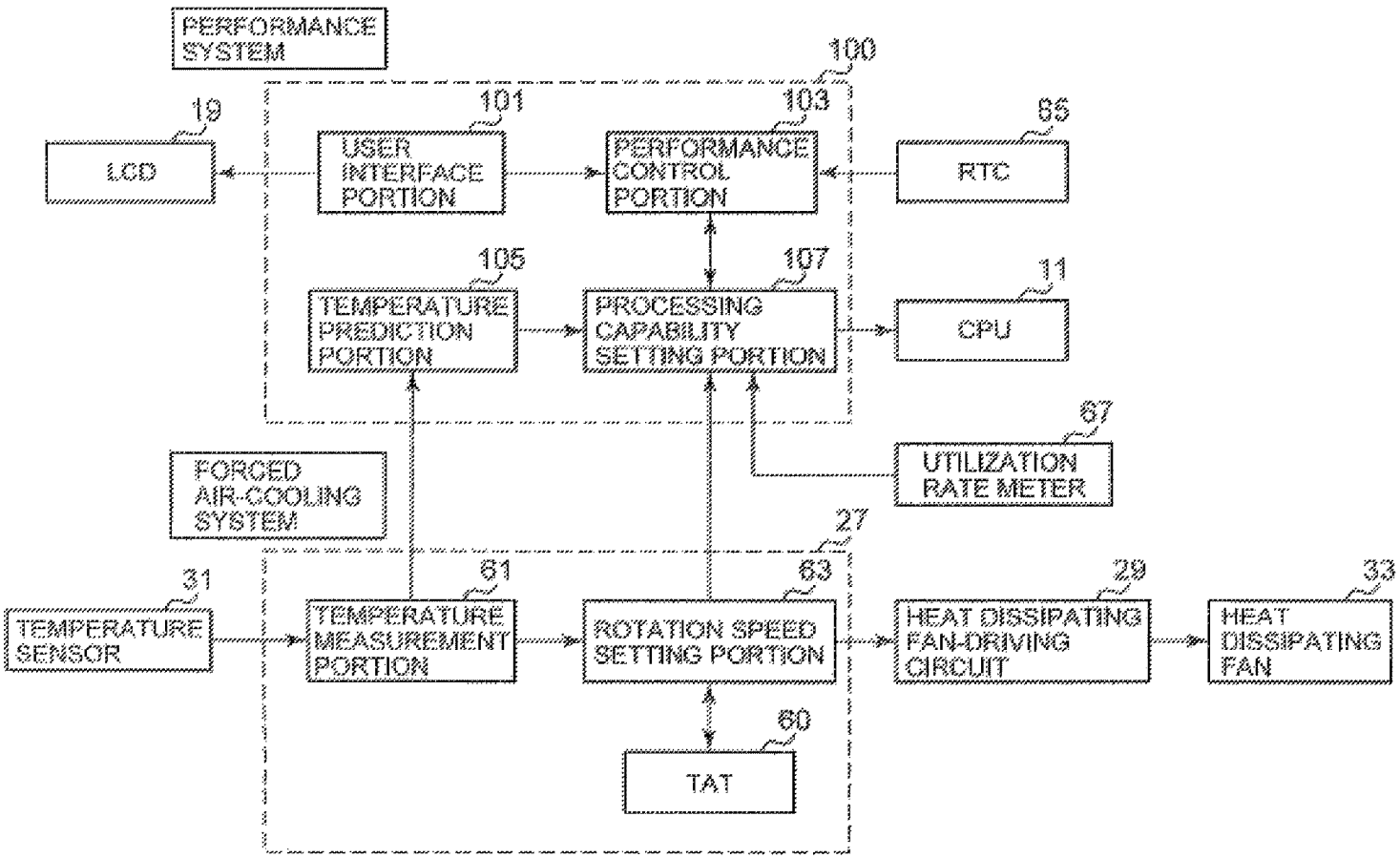
FIG. 5 is a block diagram of a heat dissipation system, in accordance with a preferred embodiment of the present invention.

FIG. 5 is a block diagram of the heat dissipation system according to a preferred embodiment of the present invention. The heat dissipation system is configured by a heat dissipation control program 100 of which main parts are executed by the CPU 11 and programs that are executed by the EC 27. The heat dissipation control program 100 is an application program running on the OS, and functions thereof are configured by a user interface portion 101, a performance determining portion 103, a temperature prediction portion 105, and a processing capability setting portion 107. The functional blocks constituting the heat dissipation control program 100 are practically implemented by a combined function of software and hardware such as a heat dissipation control program, an OS, the main memory 15, and the CPU 11.

The temperature prediction portion 105 is configured to periodically receive temperature information measured by the temperature sensors 31 from the temperature measurement portion 61 of the EC 27 and calculate the rate or acceleration of temperature rise based on the temperature information. The rate or acceleration of the temperature rise will be generally referred to as a temperature rise rate. The temperature prediction portion 105 holds therein the enable temperatures HTe, MTe, and LTe contained in the TAT 60. The temperature prediction portion 105 calculates, as a prediction time, a period of time required for the measurement temperature measured by any of the temperature sensors 31 to exceed the enable temperature HTe, MTe, or LTe based on the present measurement temperatures measured by the temperature sensors 31, the enable temperatures, and the temperature rise rate when it is assumed that the temperature rise rate at that time point is maintained and notifies the processing capability setting portion 107 of the prediction time.

The measurement temperature exhibiting the increasing tendency means that the amount of heat generation of the CPU 11 is larger than the amount of heat dissipation by the heat dissipating fan 33. When the processing capability of the CPU 11, in which the temperature is increasing, is reduced at a certain time point, the measurement temperature may converge into a temperature that is determined by thermal balance between the amount of heat generation of the CPU 11 in which the processing capability has been reduced and the amount of heat dissipation by the heat dissipating fan 33. It is therefore not the case that the measurement temperature abruptly decreases right after the processing capability was lowered, and the reducing of the processing capability needs to be performed so that the measurement temperature does not exceed the enable temperature before the measurement temperature reaches the convergence temperature.

Figure 10A:
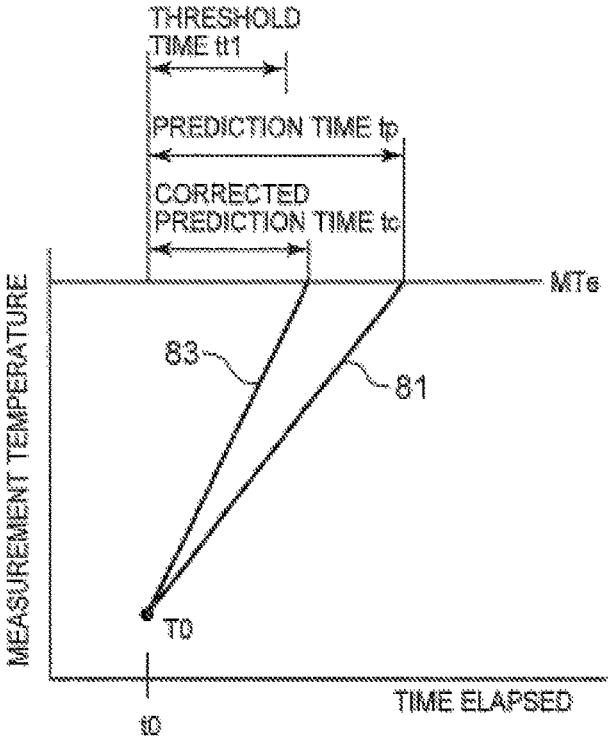
FIGS. 10A and 10B are diagrams for explaining the principle of reducing a processing capability on the basis of a prediction time.

The processing capability setting portion 107 corrects the prediction temperature received from the temperature prediction portion 105 based on an updated utilization rate of the CPU 11 received from the utilization rate meter 67 of the OS, thereby generating a new prediction temperature. The state of this time period will be described based on FIG. 10A. In FIG. 10A, the prediction time tp at time t0, the corrected prediction time tc, and a threshold time tt1 for the corrected prediction time tc are illustrated. The prediction time tp generated by the temperature prediction portion 105 is calculated with the assumption that the temperature rise rate at time t0 will be maintained; however, when the utilization rate of the CPU 11 at time t0 is low, there is a possibility that the utilization rate may increase later after time t0 so the measurement temperature reaches the enable temperature MTe within the prediction time tp and the rotation speed of the heat dissipating fan 33 is increased. Therefore, it is desirable to correct the prediction time tp based on the utilization rate.

In FIG. 10A, line 81 illustrates the prediction time tp required for the measurement temperature to reach the enable temperature MTe which is calculated at time t0 based on the temperature rise rate at time t0, and line 83 illustrates the corrected prediction time tc that is corrected from the prediction time tp based on the utilization rate at time t0. The corrected prediction time tc is calculated from the prediction time tp by taking the utilization rate at the time of prediction into account and is a time which guarantees that the measurement temperature will not reach the enable temperature MTe within a period of time shorter than the corrected prediction time.

For example, the corrected prediction time tc may be set to the same value as the prediction time tp for the utilization rate of 100% at the time of prediction, and for a utilization rate of X %, to a value obtained through multiplication of the prediction time tp with the utilization rate X %. In this case, by lowering the performance step by only one step which is the minimum unit, it is possible to increase the corrected prediction time tc to be longer than the threshold time tt1 so that the measurement temperature does not exceed the enable temperature MTe. As a result, the processing capability setting portion 107 is able to maintain the measurement temperature within the enable temperature MTe by lowering the performance step by only one step when the corrected prediction time tc becomes the threshold time tt1 or smaller. Specifically, when the performance steps at time t0 were 100% and 50%, they are lowered to 75% and 25%, respectively. Reducing the performance step by only one step, which is the minimum unit, can minimize the level of discomfort imposed to the users by the reduction of the processing capability.

Figure 10B:
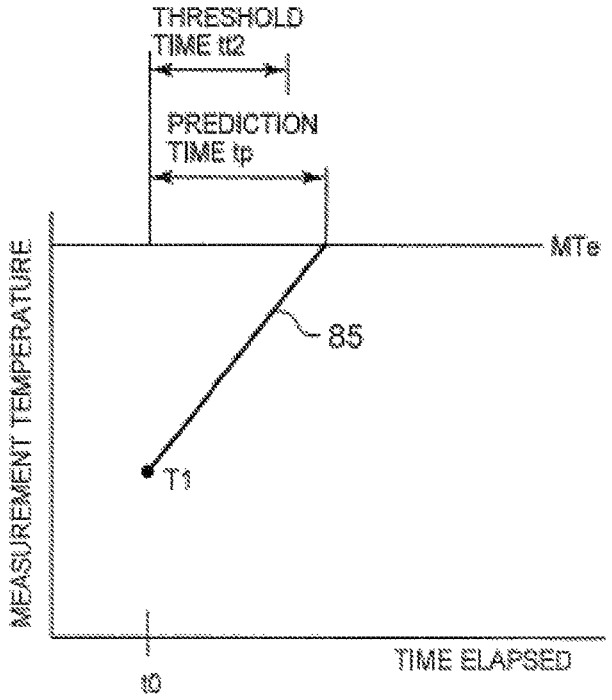

Aside from this, the processing capability setting portion 107 may be configured to lower the performance step by n (n>1) steps or more when the prediction time tp becomes a predetermined threshold time tt2 or smaller so that the measurement temperature is maintained below the enable temperature MTe. The state of this time period will be described based on FIG. 10B. Similar to the line 81 of FIG. 10A, line 85 of FIG. 10B illustrates the prediction time tp required for the measurement temperature to reach the enable temperature MTe when the measurement temperature at time t0 is T1 and it is assumed that the temperature rise rate at time t0 will be maintained. Since the prediction time tp is calculated without taking the utilization rate into consideration, depending on the utilization rate at the time of prediction, there is a possibility that the measurement temperature based on the assumption that the processing capability won't be reduced reaches the enable temperature MTe within a period of time earlier than the prediction time tp.

The more number of reduction steps can provide a greater effect on suppression of the temperature rise. However, increasing the number of reduction steps more than necessary may make the original performance of the CPU 11 unusable and it is thus undesirable. For the performance step to be reduced within a minimum necessary range, the processing capability setting portion 107 determines the number of reduction steps n based on the utilization rate of the CPU 11 at time t0 at which the prediction time tp is calculated. That is, when the utilization rate of the CPU 11 is high at time t0 at which the prediction time tp is calculated, since the possibility of the temperature reaching the enable temperature MTe within a period of time shorter than the prediction time tp is low, the performance step is lowered by only one step to 75%. On the other hand, when the utilization rate of the CPU 11 is low, since the possibility of the temperature reaching the enable temperature within a period of time shorter than the prediction time tp is high, the performance step is lowered by two or three steps to 50% or 25%. In the case of FIG. 10B, compared with the case of FIG. 10A, although the measurement temperature at the time of reducing the performance step comes closer to the enable temperature MTe and the reduction frequency of the performance step is decreased, since there is a case when the number of reduction steps becomes two or more, the possibility of the users being aware of the reduction of the processing capability increases.

In either case, if the prediction time tp for the entire temperature sensors received from the temperature prediction portion 105 is a predetermined value or more, or is a special reserved value that does not mean any temperature rise, the processing capability setting portion 107 determines that the amount of heat dissipation by the heat dissipating fan 33 over the entire system housing 3 and the amount of heat generation from the electronic devices are balanced or that the amount of heat dissipation is larger so the measurement temperature is decreasing, and the processing capability setting portion 107 increases the performance step by only one step. Moreover, when the determination is that it is not necessary to reduce or increase the processing capability is made based on the corrected prediction time tc or the prediction time tp, the processing capability setting portion 107 maintains the present performance step. In this manner, the processing capability setting portion 107 makes a determination as to whether it is necessary to change the present performance step in the increasing direction or the decreasing direction based on the present utilization rate of the CPU 11 received from the utilization rate meter 67 of the OS and the prediction time tp received from the temperature prediction portion 105 to thereby change the performance step and maintain the performance step at that time point when there is no necessity of changing the performance step.

When changing the performance step, the processing capability setting portion 107 writes setting values for the performance step in the system BIOS to be executed in the register of the CPU 11 via the power management driver. The process that the processing capability setting portion 107 performs to maintain the measurement temperature to the enable temperature or lower based on the prediction temperature will be referred to as a performance adjustment process. It should be noted that it is not always necessary to use the utilization rate of the CPU 11 in the performance adjustment process.

The processing capability setting portion 107 makes a determination whether it is necessary to change the present performance step in the increasing direction or the decreasing direction based on the temperatures measured by the respective temperature sensors 31 to reduce the present performance step when it is determined for the measurement temperature of any of the temperature sensors that the performance step should be changed in the decreasing direction, and increase the present performance step when it is determined for the measurement temperature of all the temperature sensors that the performance step should be changed in the increasing direction. The user interface portion 101 provides a setting screen to users via the LCD 19 so that the users are able to adjust a balancing point between the quietness and the processing capability which changes with the users' preference and the operation status at that moment, thereby providing a maximum level of comfort to the users.

The performance determining portion 103 starts calculating a performance characteristic value at a time point at which the processing capability setting portion 107 starts the first performance adjustment process. The performance characteristic value is a value that quantifies the degree of delay in the processing time during which the performance adjustment process is performed. The performance characteristic value can be calculated based on two factors: the number of reduction steps of the processing capability and the duration of the performance adjustment process. The performance characteristic value Pf can be calculated, for example, by $Pf=\Sigma(100-Pn)\times ty$, where Pn is the performance step and ty is a period of time during which the CPU 11 operates with the performance step Pn. A calculation example of the performance characteristic value is illustrated in FIG. 9. The greater the reduction of the processing capability and the longer the duration, the greater becomes the performance characteristic value, thus reflecting the delay in the processing time.

When the performance characteristic value reaches a predetermined threshold value, the performance determining portion 103 delivers a performance precedence command for increasing the rotation speed of the heat dissipating fan 33 to the processing capability setting portion 107. Upon receiving a notification that the rotation speed is increased from the rotation speed setting portion 63 via the processing capability setting portion 107, the performance determining portion 103 resets the calculation of the performance characteristic value and then starts calculating a new performance characteristic value at a time point at which a subsequent performance adjustment process is started, thereby generating a similar performance precedence command. Further, upon receiving information from the processing capability setting portion 107, informing that the period of time during which the CPU 11 is operating in the normal state continues for a predetermined period of time, the performance determining portion 103 resets the calculation of the performance characteristic value and then starts calculating a new performance characteristic value at a time point at which a subsequent performance adjustment process is started, thereby generating a similar performance precedence command. This is because it is thought that the case where the performance adjustment process is stopped for the predetermined period of time does not affect the user's level of comfort even when the calculation of the performance characteristic value is reset.

The threshold value for the performance characteristic value can be set by users through the setting screen provided by the user interface portion 101. The users may lower the threshold value to put an early end to the performance adjustment process when they wish to prioritize the performance in the present performance adjustment process, or may raise the threshold value to continue the performance adjustment process for a longer period time when the users wish to prioritize the quietness. The user interface portion 101 delivers the threshold value set by the users to the performance determining portion 103. An RTC 65 is a real time clock incorporated into the note PC 10 and supplies time information to the performance determining portion 103.

Upon receiving the performance precedence command from the performance determining portion 103, the processing capability setting portion 107 interrupts the performance adjustment process and returns the performance step at that moment to the maximum level of 100%. Since the measurement temperature may exceed the enable temperature if the load of the CPU 11 does not change, the rotation speed setting portion 63 of the EC 27 increases the rotation speed by one step. Upon receiving a notification from the rotation speed setting portion 63, informing that the rotation speed is increased, in a state where the performance precedence command is received, the processing capability setting portion 107 resets the performance precedence command and performs the performance adjustment process again under the increased rotation speed. It should be noted that when the performance adjustment process is stopped, the performance step does not always need to be returned to 100% as described above but may be adjusted such that if the amount of heat generation at that time point is relatively large, the present performance step of 25% is returned to 75%, for example. In this way, it is possible to cope with an abrupt temperature rise that the measurement temperature exceeds the enable temperature (for example, HTe) corresponding to a subsequent one step higher rotation speed at one adjustment and in a short period of time.

The temperature measurement portion 61 of the EC 27 converts signals received from the respective temperature sensors 31 to digitalized temperature values. The temperature measurement portion 61 transmits the temperature values to the temperature prediction portion 105 and the rotation speed setting portion 63. The rotation speed setting portion 63 delivers signals to the heat dissipating fan-driving circuit 29 based on the temperature values received from the temperature measurement portion 61 and the threshold value set in the TAT 60 and controls the rotation speed of the heat dissipating fan 33. The heat dissipating fan 33 operates at a predetermined rotation speed under the control of the heat dissipating fan-driving circuit 29. The process that the EC 27 performs to control the rotation speed of the heat dissipating fan 33 based on the measurement temperature measured by the temperature sensor 31 will be referred to as a heat dissipation amount adjustment process.

The heat dissipation control program 100 constructs a temperature control structure of a performance system that changes the performance step of the CPU 11 to change the amount of heat dissipation, thereby controlling the internal temperature of the system housing 3. On the other hand, the EC 27 constructs a temperature control structure of the forced air-cooling system that adjusts the rotation speed of the heat dissipating fan 33 based on the measurement temperature measured by the temperature sensor 31 and the threshold value of the TAT 60, thereby controlling the internal temperature of the system housing 3. Since the heat dissipation control program 100 constructing the performance system is executed by the CPU 11, there is a possibility that the execution of the heat dissipation control program 100 is affected by other programs executed by the CPU 11 and the operation thereof becomes temporarily unstable. The temperature measurement portion 61, the rotation speed setting portion 63, and the TAT 60, which construct the forced air-cooling system, are configured as firmware of the EC 27 and function independently of the CPU 11.

In other words, since the forced air-cooling system controls the heat dissipating fan-driving circuit 29 based only on the values of the temperature sensor 31 and the TAT 60 regardless of the performance adjustment process, the temperature of the system housing 3 can be maintained within a safe range even when the operation of the performance system becomes temporarily unstable due to any reasons. Moreover, since the heat dissipation control program 100 is program that is executed by the CPU 11, modification thereof is easy to be accomplished. Furthermore, since the program is structured to be layered over the forced air-cooling system, it does not require any changes to the forced air-cooling system.

Figure 6:
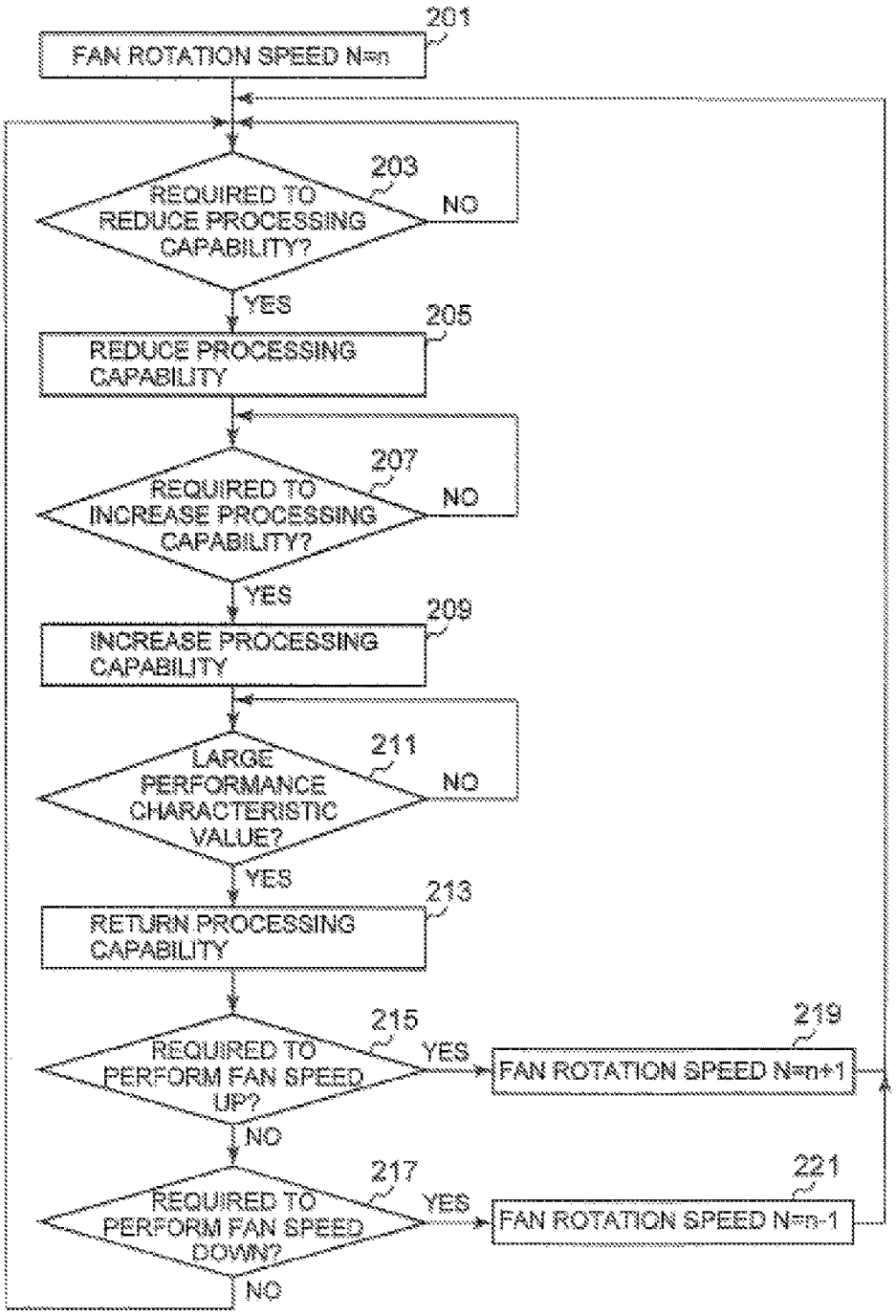
FIG. 6 is a flowchart of a method for controlling temperature of a note PC by a heat dissipation system having a performance system and a forced air-cooling system.

FIG. 6 is a flowchart illustrating a method for controlling the temperature of the system housing 3 of the note PC 10 by the heat dissipation system having two temperature control structures of the performance system and the forced air-cooling system, as shown in FIG. 5. At block 201, the heat dissipating fan 33 is rotated at a certain rotation speed by the heat dissipation amount adjustment process of the forced air-cooling system. Although the rotation speed might not increase further when the heat dissipating fan 33 is operating at the high-speed rotation, the performance adjustment process may be performed with temperature, which leads to system shutdown, being used as the threshold temperature. The temperature prediction portion 105 receives temperature values measured by the respective temperature sensors 31 from the temperature prediction portion 61 on a periodic basis, calculates the prediction time at a measurement time point at predetermined intervals of time of 2 seconds, for example, and sends a notification to the processing capability setting portion 107.

The processing capability setting portion 107 is executing the performance adjustment process based on the information on the present rotation speed received from the rotation speed setting portion 63. The CPU 11 is executing program designated by the user and program determined by the system and is generating an amount of heat determined based on the performance step and the utilization rate. When it is determined at block 203 that the processing capability needs to be reduced, the processing capability setting portion 107 lowers at block 205 the performance step by any of the methods described with reference to FIG. 10. When it is determined at block 207 that the processing capability needs to be increased, the processing capability setting portion 107 increases the performance step at block 209. The performance determining portion 103 makes a determination at block 211 as to whether or not the performance characteristic value exceeds the threshold value, and when the threshold value is exceeded, returns the CPU 11 to the normal state at block 213.

At blocks 215 and 217, the forced air-cooling executes the heat dissipation amount adjustment process based on the measurement temperature measured by the temperature sensor 31 independently of the performance system. When the measurement temperature measured by any of the temperature sensors 31 exceeds the enable temperature of the TAT 60, the rotation speed of the heat dissipating fan 33 is increased by one step at block 219. On the other hand, when the measurement temperatures measured by all the temperature sensors 31 are decreased below the disable temperature of the TAT 60, the rotation speed of the heat dissipating fan 33 is decreased by one step at block 221. The flow returns to block 203 after the operations of blocks 217, 219, and 221 are performed, and the performance system starts the performance adjustment process based on the enable temperature corresponding to a new rotation speed.

Figure 7:
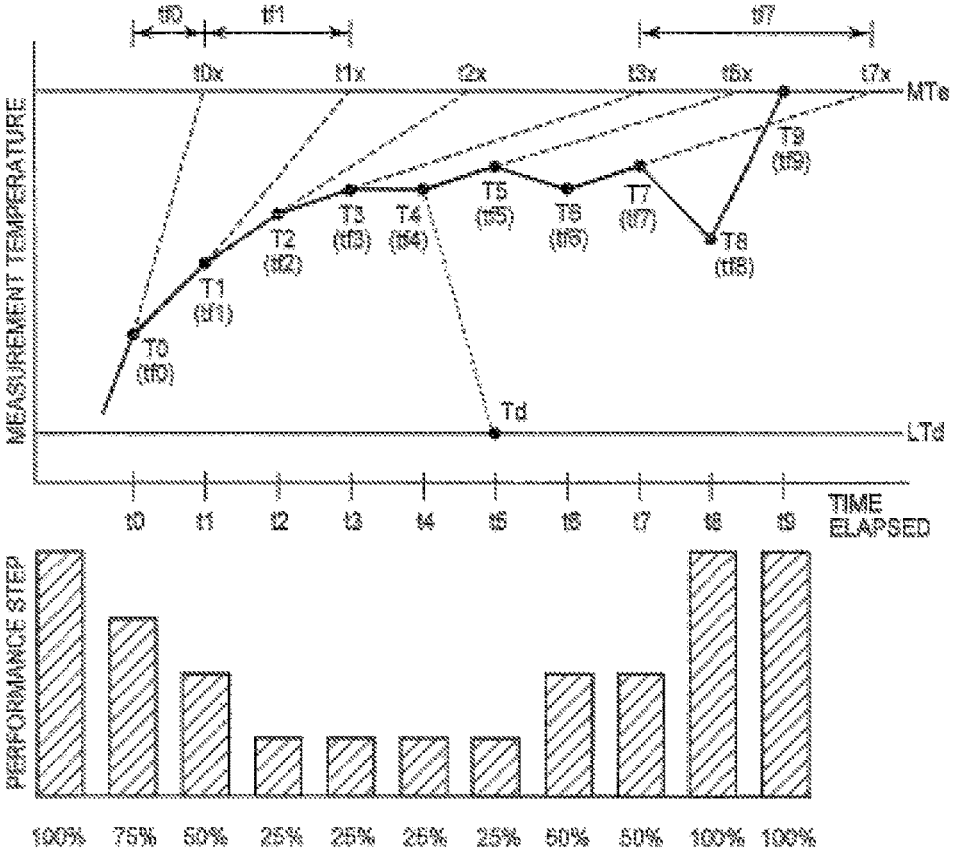
FIG. 7 is a diagram illustrating an example of the status of performance adjustment processing.

FIG. 7 is a diagram illustrating an example of the performance adjustment process when the method of FIG. 6 is executed. In FIG. 7, the horizontal axis represents time elapsed, and the vertical axis represents the measurement temperature indicated by the temperature sensor 11T embedded in the CPU 11. In FIG. 7, the performance adjustment process is performed during a time zone between t0 and t9. In this time zone, the determination of the processing capability setting portion 107 that the performance step needs to be reduced is dominated by the temperature sensor 11T. During periods before time t0, although the heat dissipating fan 33 operates at the low-speed rotation so the CPU 11 operates in the normal state while the performance adjustment process is not performed, the thermal balance between the amount of heat dissipation from the CPU 11 and the amount of heat dissipation at the low-speed rotation collapses and the measurement temperature of the temperature sensor 11T is rising.

At time t0, the temperature prediction portion 105 calculates, as the prediction time tf0, a period of time to reach time t0x at which the temperature T0 at time t0 reaches the enable temperature MTe. The processing capability setting portion 107 calculates the corrected prediction time by applying the utilization rate of the CPU 11 to the prediction time tf0 and compares the corrected prediction time with the threshold time. As a result, the processing capability setting portion 107 determines that the corrected prediction time is shorter than the threshold time and reduces the performance step of the CPU 11 by only one step to be set to 75%. The processing capability setting portion 107 reduces the performance step of the CPU 11 at time t1 and t2 by one step to 50% and 25%, respectively, because the corrected prediction time calculated from the prediction time tf1 and tf2 at time t1 and t2 is shorter than the threshold time. In addition, at time t1 and t2, since the performance steps at previous time t0 and t1 are reduced by one step, the temperature rise rate slows down and the prediction time tf1 and tf2 becomes longer than the prediction time tf0 and tf1. However, since the prediction time is still shorter than the threshold time, the processing capability setting portion 107 determines that the performance step needs to be reduced.

At time t3, t4, and t5, the corrected prediction time calculated from the prediction time tf3, tf4, and tf5 becomes longer than the threshold time. However, since the corrected prediction time is not long enough to increase the performance step, the processing capability setting portion 107 does not change the performance step of the CPU 11 at time t3, t4, and t5 but maintains the performance step at 25%. At time t6, the processing capability setting portion 107 recognizes that the measurement temperature remains unchanged or decreases so increases the performance step by one step to 50%. At time t7, since the corrected prediction time calculated from the prediction time tf7 is longer than the threshold time, the processing capability setting portion 107 does not change the performance step of the CPU 11 at time t7 but maintains the performance step at 50%.

The performance determining portion 103 starts calculating the performance characteristic value when the processing capability setting portion 107 starts the performance adjustment process at time t0. The performance characteristic value increases with the duration of the performance adjustment process. The rate of increase in the performance characteristic value increases as the number of reduction steps increases. At time t8, since the performance characteristic value has reached a predetermined threshold value, the performance determining portion 103 delivers the performance precedence command to the processing capability setting portion 107. Upon receiving the performance precedence command, the processing capability setting portion 107 returns the performance step to 100% at time t8 so that the CPU 11 returns to the normal state.

When the performance step returns to 100%, the temperature of the temperature sensor 11T converges into a temperature which is determined by the amount of heat dissipation of the heat dissipating fan 33 operating at the low-speed rotation and the amount of heat generation of the CPU 11 of which the processing capability is not reduced. In this example, since the amount of heat generation of the CPU 11 in the normal state is greater than the amount of heat dissipation, the measurement temperature at time t9 has reached the enable temperature MTe. Therefore, the forced air-cooling system increases the rotation speed of the heat dissipating fan 33 by one step to be operated at the medium-speed rotation. When the CPU 11 enters into an idle state during periods between t4 and t5 and the measurement temperature has decreased to the disable temperature LTd, the rotation speed setting portion 63 decreases the rotation speed of the heat dissipating fan 33 by one step to be operated at the ultralow-speed rotation. In this way, the performance system controls the performance step of the CPU 11 based on the prediction temperature so that the temperature does not exceed the enable temperature MTe during periods of the performance adjustment process and the CPU 11 operates at the maximum performance step.

Figure 8A:
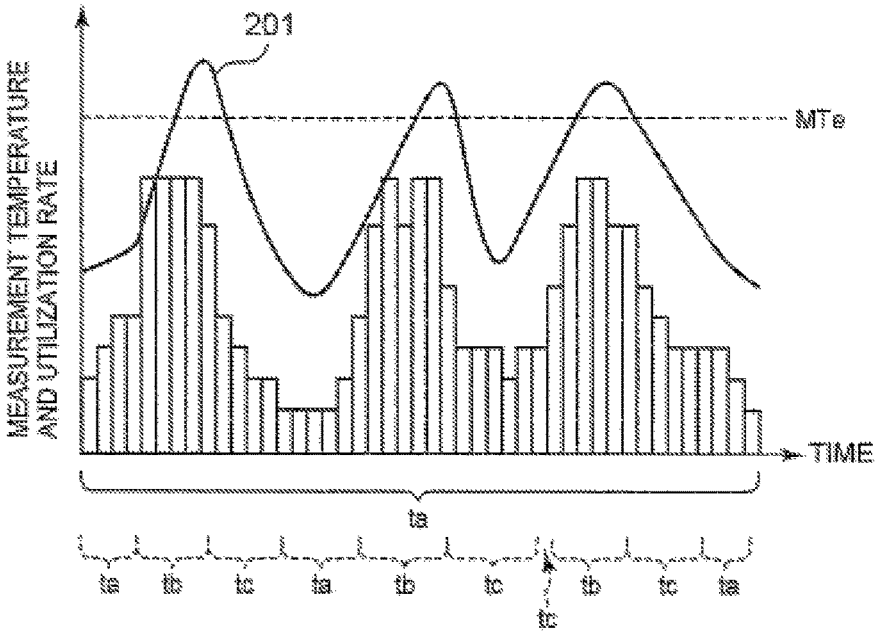
FIGS. 8A and 8B are diagrams for explaining the transitions of a measurement temperature and a performance step when the procedure of FIG. 7 is executed using a test program.
Figure 8B:
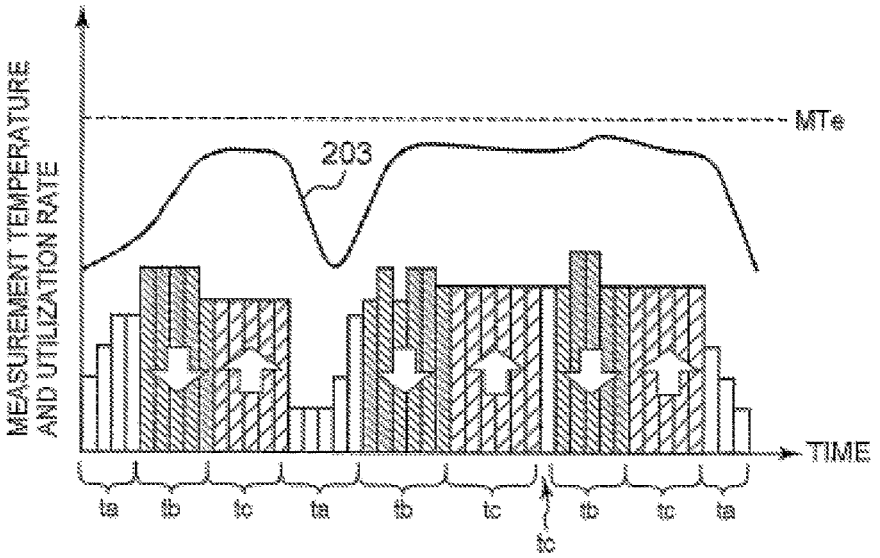

FIGS. 8A and 8B are diagrams for explaining the transitions of the measurement temperature measured by the temperature sensor 11T and the performance step when the procedure of FIG. 7 is executed using a test program. FIG. 8A illustrates the case when only the forced air-cooling system was operated, and FIG. 8B illustrates the case when both the forced air-cooling system and the performance system were operated. In FIG. 8A, although the amount of heat generation of the CPU 11 changes over the entire periods ta as depicted by the bar graph, since the performance adjustment process is not performed, the measurement temperature depicted by line 201 exceeds the enable temperature MTe at three locations and the rotation speed of the heat dissipating fan 33 is changed to the medium-speed rotation under the control of the forced air-cooling system whenever it happens.

In FIG. 8B, although the same test program as FIG. 8A is executed, since the performance adjustment process is performed, the measurement temperature depicted by line 203 does not exceed the enable temperature MTe. In this case, the amount of heat generation of the CPU 11 changes with the changes in the processing capability made to the CPU 11. During periods of tb, since the processing capability is reduced, the upper limit of the amount of heat generation is lowered and accordingly the amount of heat generation is also decreased. During periods of tc, since the processing capability is increased, the upper limit of the amount of heat generation is raised and accordingly the amount of heat generation is also increased.

From this, it can be said that the performance adjustment process temporarily reduces the processing capability during periods of tb in which the amount of tasks to be processed by the CPU 11 increases and the measurement temperature starts increasing, shifts a portion of a task to be processed during the periods of the reduced processing capability to subsequent periods of tc in which the amount of tasks is small, thereby suppressing an abrupt rise in the measurement temperature. The present invention provides a maximum level of comfort to the users by harmonizing the processing capability of the CPU 11 and the quietness of the heat dissipating fan 33 which are in trade-off relationship.

The level of comfort changes from user to user and with the operation status at that moment. The present embodiment allows a user to adjust the threshold value on the setting screen provided by the user interface portion 101, select between whether to prioritize the performance or to prioritize the quietness, and find a compromising point for fine adjustment for each user. Specifically, when a user wishes to prioritize the performance, the user is able to increase the rotation speed of the heat dissipating fan 33 at a stage where the performance characteristic value is small by setting the threshold value to a low value. When the user wishes to prioritize the quietness, the user may continue the performance adjustment process until the performance characteristic value becomes large by setting the threshold value to a large value.

Although an example where the adjustment of the processing capability is performed by the CPU 11 has been illustrated, the SpeedStep or the throttling may be performed by other processors such as a video chip. In such a case, the performance adjustment process may be performed by using the CPU 11 and the video chip or either one of them. Moreover, multiple heat dissipating fans may be installed in the system housing 3 as long as they conform with the forced air-cooling system as described in FIG. 5.

As has been described, the present invention provides a method and apparatus for managing the speed of a heat dissipating fan for a computer system while harmonizing the processing capability of a processor within the computer system.

It is also important to note that although the present invention has been described in the context of a method and apparatus, those skilled in the art will appreciate that the method of the present invention is capable of being distributed as a computer program product via a computer readable medium such as a compact disc.

While the invention has been particularly shown and described with reference to a preferred embodiment, it will be understood by those skilled in the art that various changes in form and detail may be made therein without departing from the spirit and scope of the invention.

What is claimed is:

1. A heat dissipation system within a housing of a computer, said heat dissipation system comprising:

a [heat dissipating] fan;

a temperature sensor;

a rotation speed setting portion [configured to change] *changes* a rotation speed of said [heat dissipating] fan [in a stepwise manner] *by one step* based on a threshold temperature and a measurement temperature measured by said temperature sensor; and a performance control portion [configured to] temporarily [reduce] *reduces* the processing capability of a processor within said computer in response to a determination that said measurement temperature has exceeded said threshold temperature during a predetermined period of time, wherein said performance control portion includes:

a temperature prediction portion [configured to determine] *determines* a prediction time required for said measurement temperature to exceed said threshold temperature when current processing capability is maintained, based on said measurement temperature, an increase rate of said measurement temperature, and said threshold temperature; and a processing capability setting portion [configured to change said processing capability of said processor based on said prediction time], *which receives a rotation speed notification from said rotating speed portion, changes said prediction temperature received from said temperature prediction portion to a new prediction temperature based on an updated utilization rate of said processor*.

2. The heat dissipation system of claim 1, wherein said processing capability setting portion executes reducing, maintaining or increasing of said processing capability based on said prediction time.

3. The heat dissipation system of claim 1, wherein said processing capability setting portion determines an amount of reduction in said processing capability based on said prediction time and a utilization rate of said processor.

4. The heat dissipation system of claim 1, wherein said processing capability setting portion produces a corrected prediction time, which is corrected from said prediction time, based on utilization rate of said processor and reduces said processing capability by a minimum unit amount based on said corrected prediction time.

[5. The heat dissipation system of claim 1, further comprising a performance determining portion configured to determine a performance characteristic value on the basis of a period of time during which said processing capability is reduced from that in a normal state and an amount of reduction in said processing capability and to issue a performance precedence command to said processing capability setting portion, and said processing capability setting portion causing said processor to return to the normal state or a state equivalent thereto on the basis of said performance precedence command.]

[6. The heat dissipation system of claim 5, further comprising a user interface portion configured to produce a setting screen, on which a user inputs a threshold value for generating said performance precedence command based on said performance characteristic value, and to deliver said threshold value to said performance determining portion.]

7. The heat dissipation system of claim 1, wherein said temperature prediction portion determines a new prediction time for a new threshold temperature after the rotation speed of said heat dissipating fan is changed by said rotation speed setting portion, and said processing capability setting portion changes said processing capability of said processor based on said new prediction time.

8. The heat dissipation system of claim 1, wherein said threshold temperature includes a first threshold value which serves as a reference for increasing the rotation speed of the heat dissipating fan from a first rotation speed to a second rotation speed higher than the first rotation speed and a second threshold value which is smaller than the first threshold value and serves as a reference for decreasing the rotation speed from the second rotation speed to the first rotation speed.

9. The heat dissipation system of claim 1, wherein said threshold temperature is set so that a housing temperature of said computer is suppressed to a predetermined value or less.

10. A heat dissipation method for a computer comprising:

obtaining a measurement temperature of a computer by a temperature sensor;

changing a rotation speed of a [heat dissipating] fan [in a stepwise manner] *by one step* based on a threshold temperature and a measurement temperature measured by said temperature sensor;

determining whether or not said measurement temperature has exceeded said threshold temperature in a predetermined period of time, wherein said determining further includes determining *a prediction temperature and* a prediction time required for said measurement temperature to exceed said threshold temperature when current processing capability of a processor is maintained, based on said measurement temperature, an increase rate of said measurement temperature, and said threshold temperature; and in response to a determination that said measurement temperature has exceeded said threshold temperature, [temporarily reducing the processing capability of a processor within said computer based on said prediction time] *changing said prediction temperature to a new prediction temperature based on an updated utilization rate of said processor*.

11. The heat dissipation method of claim 10, further comprising in response to a determination that said measurement temperature has not exceeded said threshold temperature, increasing or maintaining said processing capability.

12. The heat dissipation method of claim 11, wherein said determining, said reducing and said increasing or maintaining step are executed based on a new threshold temperature for each of changed rotation speeds.

13. The heat dissipation method of claim 10, further comprising determining an amount of reduction in said processing capability based on a utilization rate of said processor.

14. The heat dissipation method of claim 13, further comprising:

determining a performance characteristic value on the basis of a period of time during which said processing capability is reduced and a degree of reduction in said processing capability; and causing said processor to return to a normal state on the basis of said performance characteristic value.

15. The heat dissipation method of claim 14, further comprising receiving a threshold value of said computer for said performance characteristic value from a user.

16. A non-transitory computer readable medium having a computer program product for performing heat dissipation on a computer having a processor capable of changing its processing capability, a heat dissipating fan, and a temperature sensor, said *non-transitory* computer readable medium comprising:

computer program code for obtaining a measurement temperature of a computer by a temperature sensor;

computer program code for changing a rotation speed of a [heat dissipating] fan [in a stepwise manner] *by one step* based on a threshold temperature and a measurement temperature measured by said temperature sensor;

computer program code for determining whether or not said measurement temperature has exceeded said threshold temperature in a predetermined period of time, wherein said determining further includes determining *a prediction temperature and* a prediction time required for said measurement temperature to exceed said threshold temperature when current processing capability is maintained, based on said measurement temperature, an increase rate of said measurement temperature, and said threshold temperature; and computer program code for, in response to a determination that said measurement temperature has exceeded said threshold temperature, [temporarily reducing the processing capability of a processor within said computer based on said prediction time] *changing said prediction temperature to a new prediction temperature based on an updated utilization rate of said processor*.

17. The *non-transitory* computer readable medium of claim 16, further comprising computer program code for, in response to a determination that said measurement temperature has not exceeded said threshold temperature, increasing or maintaining said processing capability.

* * * * *